United States Patent [19]
Ali-Yahia et al.

[11] Patent Number: 5,502,832
[45] Date of Patent: Mar. 26, 1996

[54] ASSOCIATIVE MEMORY ARCHITECTURE

[75] Inventors: Tahar Ali-Yahia, Vivo Jeay; Michel Dana, Paris, both of France

[73] Assignee: France Telecom-Etablissement Autonome De Droit Public, Paris, France

[21] Appl. No.: 10,600

[22] Filed: Jan. 28, 1993

[30] Foreign Application Priority Data

Jan. 31, 1992 [FR] France .................................. 92 01082

[51] Int. Cl.$^6$ .................................................. G06F 12/04
[52] U.S. Cl. .................. 395/435; 364/238.7; 364/246.3; 364/252.5; 364/259.7; 364/DIG. 1; 365/49
[58] Field of Search .................................... 395/425, 435; 364/200 MS File, 900 MS File, 238.7, 246.3, 252.5, 259.7

[56] References Cited

U.S. PATENT DOCUMENTS

| | | | |
|---|---|---|---|
| 4,257,110 | 3/1981 | Lamb et al. | 365/49 |
| 4,888,731 | 12/1989 | Chuang et al. | 365/49 |
| 4,928,260 | 5/1990 | Chuang et al. | 365/49 |
| 4,959,811 | 9/1990 | Szczepanek | 365/49 |
| 4,996,666 | 2/1991 | Duluk, Jr. | 365/49 |

FOREIGN PATENT DOCUMENTS 380294   8/1990   European Pat. Off. .

OTHER PUBLICATIONS

"Content-Addressable Memories" by Teuvo Kohonen, 1980, pp. 142–153 Textbook, Springer-Verlag Berlin--Heidelberg New York.

Lawrence T. Clark et al., "A Pipelined Associative Memory Implemented in VLSI", IEEE Journal of Solid State Circuits, vol. 24, No. 1, Feb. 1989 pp. 28–34.

IEEE Journal of Solid State Circuits, vol. SC–20, No. 5, Oct. 1988, pp. 543–547, "An 8–Kbit Content-addressable and Reentrant Memory", by Hiroshi Kadota et al.

Electronique Hebdo, No. 97, 1989, p. 19, "Donnez–lui le mot de passe, la mémorie se chargera de trouver l'information" (Give it the password and the memory will find the information itself).

IEEE Journal of Solid State Circuits, vol. 23, No. 2, Apr. 1988, pp. 543–547, "A 9–Kbit Associative Memory for High–Speed Parallel Processing Applications", by Simon R. Jones et al.

Proceedings of the IEEE International Conference on Computer Design (ICCD 86), pp. 574–577, "A 20 Kb CMOS Associative Memory LSI for Artificial Intelligence Applications", by Takeshi Ogura.

IEEE Journal of Solid State Circuits, vol. 24, No. 1, Feb. 1989, pp. 28–34, "A Pipelined Associative Memory Implemented in VLSI", by L. T. Clark and R. O. Grondin.

Proceedings of the IEEE, vol. 73, No. 6, Jun. 1985, pp. 1142–1144, "A Boolean Content Addressable Memory and its Applications", by H. Shin and M. Malek.

Proceedings of the Fifth International Conference and Symposium on Logic Programming, pp. 1448–1473, Aug. 1988, "An Architecture Based on Content–addressable Memory for the Rapid Execution of Prolog", by C. Stormon, M. Brule, J. Oldfield and J. C. D. F. Ribeiro.

French Search Report, FR 9201082.

Primary Examiner—Tod R. Swann
Assistant Examiner—Frank J. Asta
Attorney, Agent, or Firm—Pearne, Gordon, McCoy & Granger

[57] ABSTRACT

An association memory which permits the execution of all kinds of comparative operations. The associative memory includes a memory map (1) in which a search argument, which has been processed in a scanning module (3) and a masking unit (5,7), is compared to the data stored in the memory. After this comparison, the data obtained is recorded in a response register (11). When the search data and the stored data supply an association of variable length words, the result data is processed in a module for the processing of variable-length words (13) and in a multiple-response management module.

5 Claims, 4 Drawing Sheets

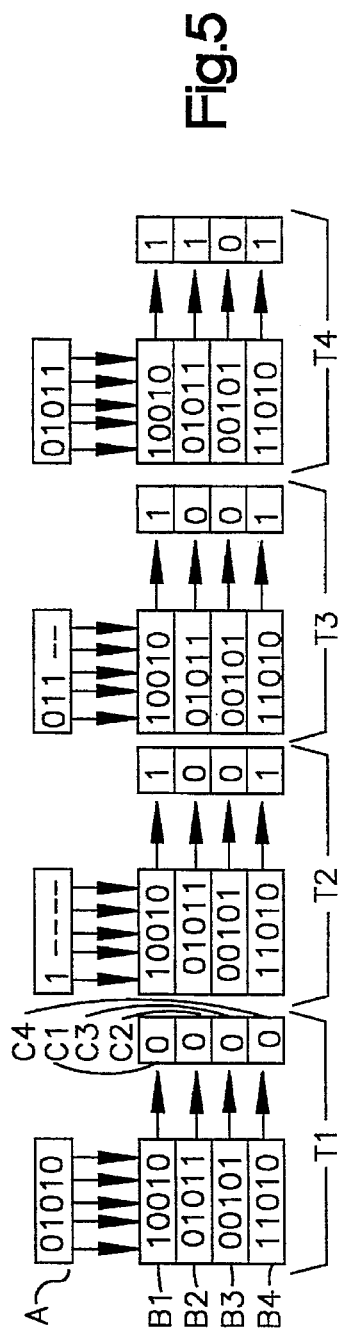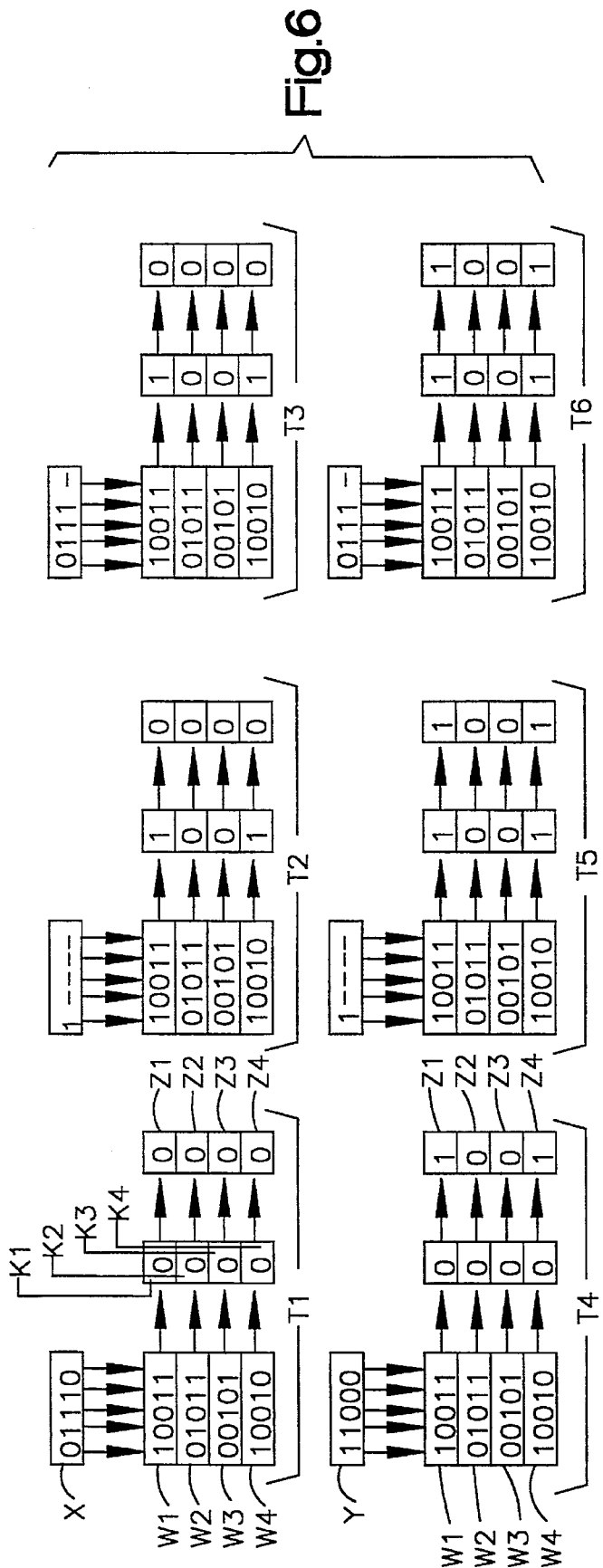

ASSOCIATIVE MEMORY ARCHITECTURE

BACKGROUND OF THE INVENTION

The invention concerns an associative memory (or content addressable memory [CAM]) architecture supporting various comparative tests as well as operations on variable-length words.

Such a memory can be used in the majority of computer fields where the responses sought are the result of comparisons between a search argument and a set of words contained in the associative memory. More particularly, the present invention applies to the processing of databases (for example, in relational algebra operations), in the execution of artificial intelligence languages (clause filtering in PROLOG, evaluation of function invocation in LISP, and method searches in object languages), and in highspeed FFDI local fiber-optic networks (address filtering, bridges and repeaters).

Associative memories are generally viewed as effective means for significantly improving the performance of computers running specific applications requiring excessive calculation times.

In effect, an associative memory is a data-storage mechanism in which the data-search occurs directly in the memory contents and not in the addresses of the data stored in the memory.

The architectures of known associative memories generally vary as a function of the applications utilized. The associative memory used for Data Flow calculators (made by the Japanese company Matsushita Electrical Industrial) is described in an article by Hiroshi Kadota et al., entitled "An 8-Kbit Content-addressable and Reentrant Memory", published in the IEEE *Journal of Solid State Circuits*, volume SC-20, number 5, Oct. 1988, pages 543 to 547.

Another associative memory architecture was used for the local networks (AMD, Am 99C10) described in an article entitled "Donnez-lui le mot de passe, la mémoire se chargera de trouver l'information"("Give it the password and the memory will find the information itself") published in *Electronique Hebdo*, number 97, 1989, page 19.

Another kind of associative memory architecture, devoted to the processing of signals and images, is described in an article by Simon R. Jones et al., entitled "A 9-Kbit Associative Memory for High-Speed Parallel Processing Applications", published in the IEEE *Journal of Solid Stage Circuits*, volume 23, number 2, Apr. 1988, pages 543 to 547.

Other associative memory architectures for specific artificial intelligence applications, neuronal networks, the processing of lists in LISP, and the rapid scanning of graphs are described in articles written by Takeshi Ogura ("A 20 Kb CMOS Associative Memory Lsi for Artificial Intelligence Application", in *Proceedings of the IEEE International Conference on Computer Design* (ICCD 86) pages 574 to 577) L. T. Clark and R. O. Grondin ("A Pipelined Associative Memory Implemented in VLSI", in the IEEE *Journal of Solid State Circuits*, volume 24, number 1, Feb. 1989, pages 28 to 34), and H. Shin and M. Malek ("A Boolean Content Addressable Memory and its Applications", in *Proceedings of the IEEE*, volume 73, number 6, Jun. 1985, pages 1142 to 1144).

Many other types of associative memory architectures are described in different publications. Nevertheless, all of those associative memories can only be used to run a limited number of applications.

In effect, known architectures (and, in particular, the architectures described in the abovementioned articles) are characterized by an organization (parallel, bit-series, word-series, etc.) which is dependant upon one (or possibly several) target application(s).

The advantage of the present invention is precisely that it permits the use of associative memories in a number of different applications.

The size of associative memories is limited by two sorts of parameters: economic and technical.

Limitations due to economic parameters can be mitigated by considering different organizations which require a compromise between the speed, size and cost of the memory (its cost is determined by the cost of the storage elements and that of the interconnections among memory cells).

Technical parameters are those which limit the size of a memory-word and the size of the memory [itself]. More precisely, those parameters which, in the former state of the art, posed an obstacle to our ability to use associative memories in different fields of application without having to conceptualize anew the architecture of the memory for each application, were: the processing of words or of associations of variable-length words, increases in the size of the words, absence of hardware structure integrated into the memory to execute text operations other than equality, and the complex applications which derive therefrom.

The present invention overcomes the limitations due to certain of these very same technical parameters. The article entitled "A 20 kb CMOS Associative Memory LSI for Artificial Intelligence", in the *Proceedings of the IEEE International Conference on Computer Design* (ICCD 86), pages 574 to 577, proposes a solution to the problem of variable-length word association. In that article, the author suggests that the memory word be broken down into an "information" field, coded in 32 bits, and a "number" field, coded in 8 bits. The number field permits the numbering of words belonging to the same association. This solution is costly in terms of hardware complexity, and reduces the possibility of increasing the size of the memory's information field by integrating the processing of variable-length words into the memory map itself. While this solution solves the problem of managing variable-length words, it is not particularly appropriate for operations involving the recognition of character-strings within text.

Another solution is described by C. Stormon, M. Brule, J. Oldfield and J. C. D.F. Ribeiro in an article entitled "An Architecture Based on Content-addressable Memory for the Rapid Execution of Prolog", published in *Proceedings of the Fifth International Conference and Symposium on Logic Programming*, pages 1448 to 1473, Aug. 1988. This solution for resolving the problem of processing variable-length words also took into account signals emitted from a multiple response management module. In this case as well, the solution adopted is designed for the selection of clauses in PROLOG.

Yet another solution requires that all the words stored in the memory be of the same size and that the address of the beginning of each word be known before the search phase. This solution was proposed by Stuart J. Adams et al. in an article entitled "A Parallel General Purpose CAM Architecture", published in the *Proceedings of the Fourth MIT Conference on Advanced Research in VLSI*, pages 51 to 71, 1986.

SUMMARY OF THE INVENTION

An object of the present invention is to provide an associative memory architecture which groups together, in a single integrated circuit, the functions necessary to support all sorts of applications requiring content addressing.

The present invention thus covers media or means for processing words, or associations of variable-length words, and media or means for executing operations other than equality tests. Thanks to these media or means, the associative memories created by the architecture according to the present invention allow one to enlarge the range of target applications, such as artificial intelligence languages, operations on databases and all operations requiring of character-string recognition.

In the whole description which follows, it is assumed that an association of words is an ordered set of words, any number of words of which may vary, as may the length of each word. More precisely, an object of the present invention is to provide an associative memory that allows search data (also known as search arguments) to be compared with a multiplicity of data stored in at least one data register which is available at the outputs of this register, which includes:

comparison media or means, with inputs connected to the outputs of the data register, to process the search data and compare it with the stored data, and supply result data to no less than one output;

manipulation media or means, with at least one input connected to the output of the comparison media or means, to process result data obtained after comparison of the search data with the stored data;

a control unit, with outputs connected to the command inputs of the comparison and manipulation media or means, to control information exchanges between the comparison and manipulation media or means characterized by the fact that the manipulation ,media or means includes a unit for processing associations of variable-length words, with each search datum and each stored datum including a word or an association of variable-length words. The comparison media or means conveniently include a memory map and a preprocessing unit which generate, on the basis of the search data, comparison data for the execution of a multiplicity of comparison functions in the memory map.

Moreover, the comparison media or means include a masking unit, connected to an output of the preprocessing unit and to an input of the memory map, that masks at least part of a word of a comparison datum so that, in the memory map, the unmasked part of the word is compared with the corresponding parts of the stored data words.

In one embodiment of the invention, the preprocessing unit includes, first, a shift register connected to an output of the data register and to an input of the control unit, a bit counter connected to an output of this control unit, and a decoder connected to an output of the bit counter; and second, an address register connected to the output of the data register, and an exclusive OR (XOR) logic gate, connected to an output of the address register and to an output of the decoder to supply the comparison datum.

In another embodiment of the invention, the preprocessing unit includes, firstly, a first shift register connected to an output of the data register and to an input of the control unit, and a second shift register connected to an output of the said control unit; and secondly, an address unit connected to the output of the data register and an exclusive OR (XOR) logic gate connected to an output of the address register and to an output of the second shift register to supply the comparison datum.

The unit for processing associations conveniently includes a processing module for words in order to manage a dialogue between words in the same association, each word of the association having a position field indicating the position of the word in the association and a result field indicating the result of the comparison of the search datum word with the stored data words, the dialogue management occurring as a function of the indications contained in the position and result fields.

Moreover, the unit for processing associations includes a multiple response management module in order to generate an address for each of the result data.

BRIEF DESCRIPTION OF THE DRAWING FIGURES

Other advantages and characteristics of the invention are indicated in the following description - which is only provided by way of example, but in no way limits the invention's scope -which makes reference to the attached drawings which include:

FIG. 1, which functionally represents the architecture of the associative memory covered by the invention;

FIGS. 2a and 2b, which functionally represent two possible ways of realizing the scanning module:

FIG. 3, which represents, in a functional diagram, an architecture for the module that processes variable-length words;

FIG. 4, which represents the logical diagram of the TAG operator, i.e. the processing operator for variable-length words;

FIG. 5, which illustrates the steps of an inequality test, using a search datum with the value 01010 as an example;

FIG. 6, which illustrates a search operation for data lying within two limits, one indicated by the value 01110 and the other by the value 11001.

DETAILED DESCRIPTION OF THE PREFERRED EMBODIMENTS

Figure 1:
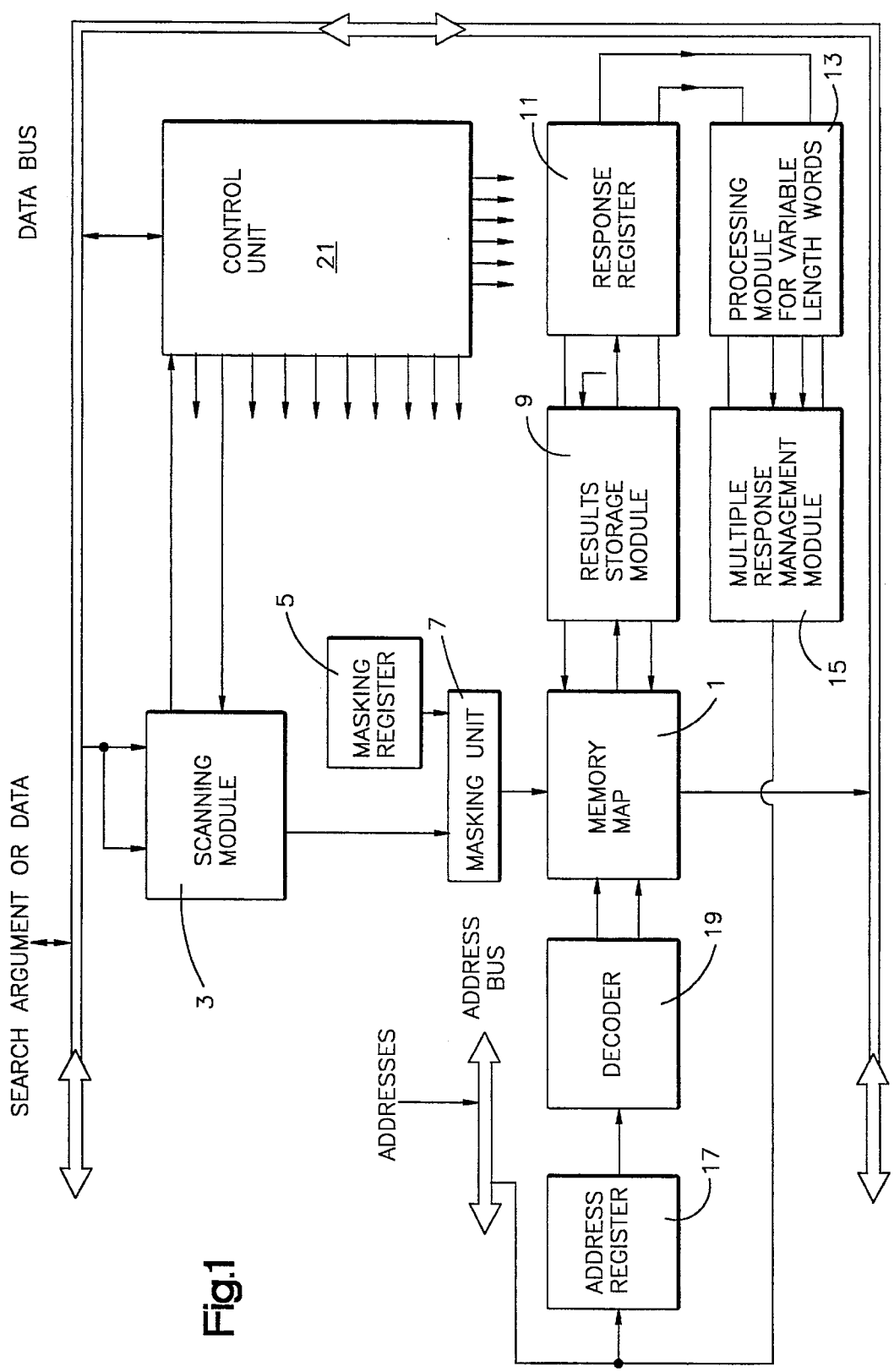

In FIG. 1, a functional schematic drawing of the associative memory architecture covered by the present invention is provided. This associative memory includes different types of elements, namely storage elements, processing elements, and routing elements for data and addresses. The storage elements are made up of different registers, such as an address register, a data register, a response register and a masking register. The processing elements are made up of a masking unit, a scanning module, an associative memory map, a multiple response management module, a module for processing variable-length words and a control unit.

In FIG. 1, the address bus is labeled AB and the data bus DB, these buses allowing for the routing of the addresses (Ad) and the data (Arg), respectively, in particular to the scanning module, memory map and control unit.

The memory map (1) is made up of a set of static memory nodes, each node being generally constituted by a set of transistors and a comparison logic. In effect, the search arguments (Arg) input into the associative memory are compared with the data stored in memory (for example, in a data register).

In addition to a memory map (1), the comparison media or means also include a scanning module (3), masking register (5) and masking unit (7).

The associative memory also includes manipulation media or means made up of a storage module for results (9), a response register (11), a processing module for variable-length words (13) and a multiple response management module (15). In addition, it includes an address register (17) and a decoder (19).

The control unit (21) ensures the control of information exchanges between the different modules and registers of the associative memory.

The search argument (Arg) is input into the comparison media or means and, more specifically, into the scanning module (3), by means of the data bus (DB). Similarly, the data contained in the memory map (1) are also sent down the data bus (DB), and the control unit (21) receives and manages information about these data. In addition, the data bus (DB) receives either the datum to be compared or the address of a datum to be read or written.

As indicated above, the associative memory architecture proposed here allows for the execution of operations other than equality operations between a search argument and data stored in the memory. This architecture thus allows for the reduction of all sorts of comparison operations (such as inequalities, greater than and less than tests, etc. ) to a sequence of equality operations, obviating the need to add a logic circuit to the memory map, as opposed to what was required for the memory maps used in the former state of the art.

In order to do so, this architecture utilizes a scanning module (3), masking register (5) and masking unit (7). The scanning module (3) allows one to generate a comparison datum by beginning with the search argument (Arg). This comparison datum can be input into the masking unit (7) and partially processed therein before entering the memory map (1), where it is compared to the data stored in the memory.

Figure 2A:
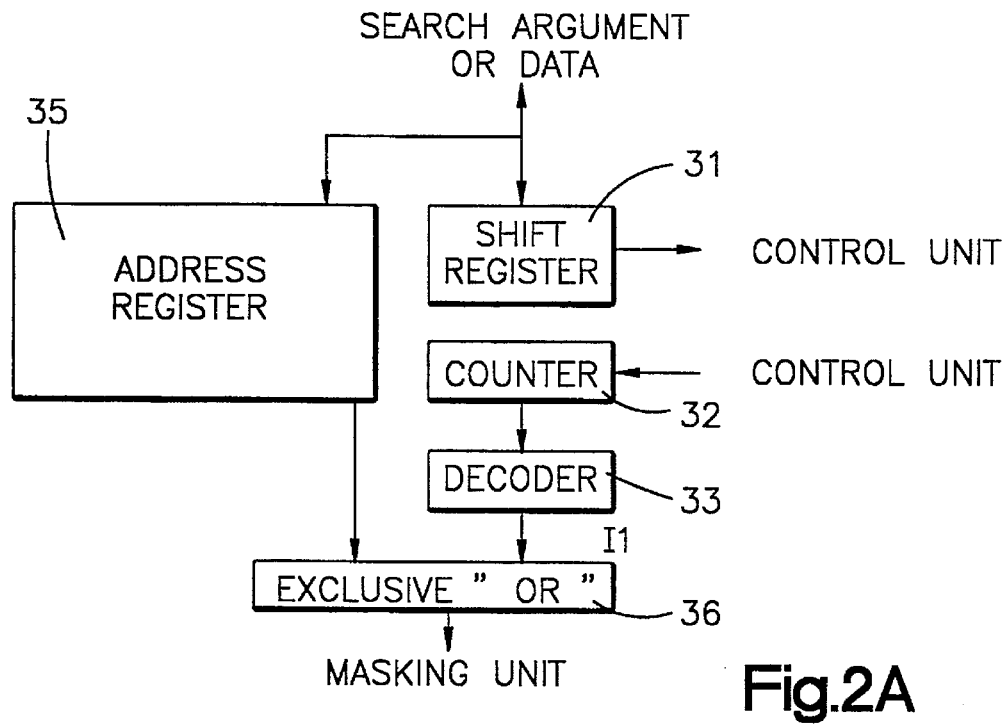

More precisely, this scanning module (3) includes, according to a first embodiment of the invention presented in FIG. 2a: a shift register (31), counter (32), decoder (33), address register (35) and exclusive OR (XOR) logic gate (36). The shift register (31) is connected, at its output, to the control unit symbolized by CU in the figure. The counter (32) is connected, at its input, to the control unit CU and, at its output, to the decoder (33). The address register (35) and the aforementioned set (31, 32 and 33) are connected to the two inputs of the exclusive OR (XOR) logic gate parallel to this set.

The search argument is introduced into the input of the address register (35) and the set (31, 32 and 33). The search argument is simultaneously stored in the address register (35) and input into the shift register (31). At that point, the counter (32) is set to its maximum value, most often 32.

In the sample comparison tests explained below, the search argument contains five bits; in such cases, the counter would be set at the value five.

With each pulse of the clock, the shift register (31) shifts to the left, i.e. it moves from the low-order bit to a higher-order bit. With each of these shifts, the counter (32) decrements its contents by 1. These shifting and decrementing operations are reiterated until the value 0 of the output bit of the shift register (31) is encountered. At that point, the decoder (33) receives the value contained in the counter (32), i.e. the value corresponding to the position of this last bit at 0. The decoder (33) then indicates, at its output, the position of this bit by setting this bit at 1 and leaving the other bits at 0. It is this latter datum (namely, that indicating the position of the last bit at 0) which is input into the exclusive OR (XOR) logic gate (36) through the input I1, at the same time that the search argument (Arg), stored in the address register (35), is introduced via input I2 into the exclusive OR (XOR) logic gate (36). We thus obtain, on the basis of these two latter data, the comparison datum which is sent toward the masking unit symbolized by MU in the figure. Information regarding the state of the shift register (31) is sent to the control unit, which can then transmit the information to the masking register.

Figure 2B:
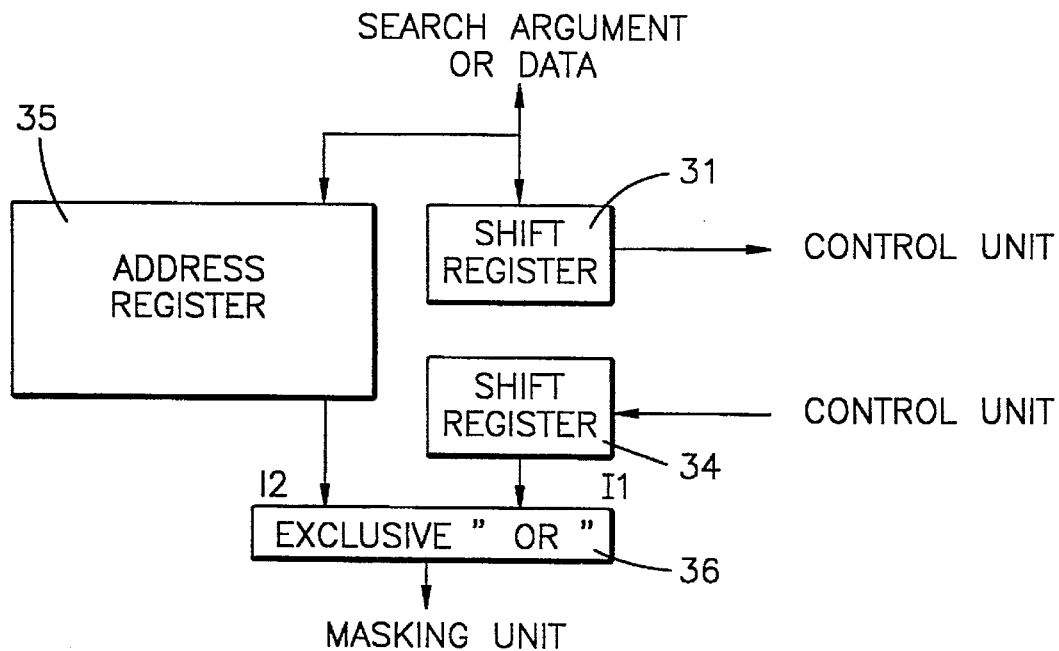

Another embodiment of the scanning module is represented in FIG. 2b. Here the scanning module includes two shift registers (31 and 34) connected in parallel with an address register (35).

The first shift-register (31) receives, at its input, the search argument (Arg); its output is connected to the control unit (symbolized by CU). The second shift-register (34) is connected, at its input, to the CU and, at its output, to the exclusive OR (XOR) logic gate (36). The output of this address register (35) and the output of the second shift register are connected to inputs I2 and I1 of the exclusive OR (XOR) logic gate, respectively. The first shift register (31) receives the value of the search argument. The same is true for the address register (35) which stores the said search argument. In its initial state, the second shift register (34) is set at 0, except for its high order bit, i.e. its high order bit is set at 1 and all the other bits are set at 0.

In addition, with each shift operation carried out by this first shift register (31) on the search argument (Arg), two processes are possible as a function of the value of the output bit: if the output bit is equal to 0, the second shift-register (34) shifts its contents one position to the right, i.e. it moves from the highest-order bit to the lowest-order bit; if the output bit is equal to 1, the execution of the exclusive OR (XOR) logic gate is commanded (36), with, at the input, both the search argument contained in the address register (35) and the content of the second shift register (34). At the output of the logic circuit (36), one obtains the comparison datum which is input into the masking unit (symbolized by MU in the figure).

As in the first embodiment of the scanning module (3) (FIG. 2A), information concerning the state of the first shift register (31) is transmitted to the control unit, which sends information on the state of this first shift-register (31) back to the masking register.

This masking register includes, according to one way of realizing this invention, a shift register. It allows for the designation of the bits of the search argument (i.e. of the datum to be compared) which play a role in the comparison operations. Initially, all the bits are set at 1. With each pulse of the clock, the masking register shifts its content one position to the right (i.e. from the most highest order bit to the lowest order bit). In this way, the bits returning to "value 0 " correspond to the bits involved in the comparison. The bits remaining at "1" correspond to the masked bits.

The operation carried out by the exclusive OR (XOR) logic gate (36) between the contents of the address register (35) containing the search argument and the output of the decoder (33) (or of the second shift register [34] in the second embodiment of the invention) results in a value that is referred to here as "the comparison datum". One has thus reproduced the initial search argument in which the first bit equal to 0 is set at 1.

The exclusive OR (XOR) operator is universal for two tests of inequality (greater than and less than). In effect, if the operation carried out is a test such as "A less than ? ", the step carried out by the scanning module takes as its search criteria the bits equal to 0. On the other hand, if the operation carried out is a test of the type "A greater than ? ", the step carried out by the scanning module takes as its search criteria the bits equal to the search argument.

The architecture described in the invention sequentially carries out the test for inequality by slices of X bits (X being the size of the memory word, for example "32"), by bringing into play data greater than the size of the memory-word (X bits). By considering a test for inequality on numbers with 2X bits, the search operation for all the words in the associative memory whose content is less than a given value A (taken to be the search argument) consists in carrying out the test for inequality in two stages on slices of X bits by using the following function:

$$(A>?)=1 \text{ if } (A1>B1)+(A1=B1)(A2>B2),$$

where A1 and B1 are the first X high order bits and A2 and B2 the last X low order bits.

Most other comparison operations can be carried out by means of test operations based on equality and/or inequality. Their implementation thus does not require any change in the associative memory architecture provided by this invention.

A search operation for values lying within an interval [B, C] is obtained by executing the following steps:

Step one: One must first test the inequality by which the values of the stored data are greater than B, by means of the operations described above;

Step two: Similarly, one must test the inequality by which the values of the stored data are less than C, by means of operations which have already been described above; and Step three: one must carry out the intersection of the results obtained in the first and second steps described above; this intersection consists in carrying out a test for equality between the values obtained in the two preceding steps.

The architecture provided by the invention also allows one to carry out operations such as: the search for the maximum, convergence (by lower value or by upper value), calculations of an absolute limit, the search for proximity, etc., as all of these operations can be reduced to a sequence of equality and/or inequality operations.

In FIG. 1, the manipulation media or means are also represented. These media include the result storage module (9), the response register (11), the processing module for variable-length words (13), and the multiple response management module (15).

This manipulation media essentially allow one to process variable-length associations whose size is limited only by the capacity of the associative memory.

To manage variable-length associations, i.e. a number of variable words, one inputs supplementary information into the coding of the associations in order to establish a dialogue and arbitration between words belonging to one and the same association. In order to do so, one uses a processing module for variable-length words known as a "TAG".

In order to use this TAG module, one attributes to each datum (search datum and/or stored datum) and, more specifically, to each word in the association, a field called a "Next" field, which includes information as to the position of the word in an association of variable-length words.

In one way of realizing the invention, the "Next" fields are attributed to the stored data words. Another way of realizing the invention, in which the "Next" fields are attributed to the search data words, will be described below.

The "Next" field is also known as a "word position field".

Figure 3:
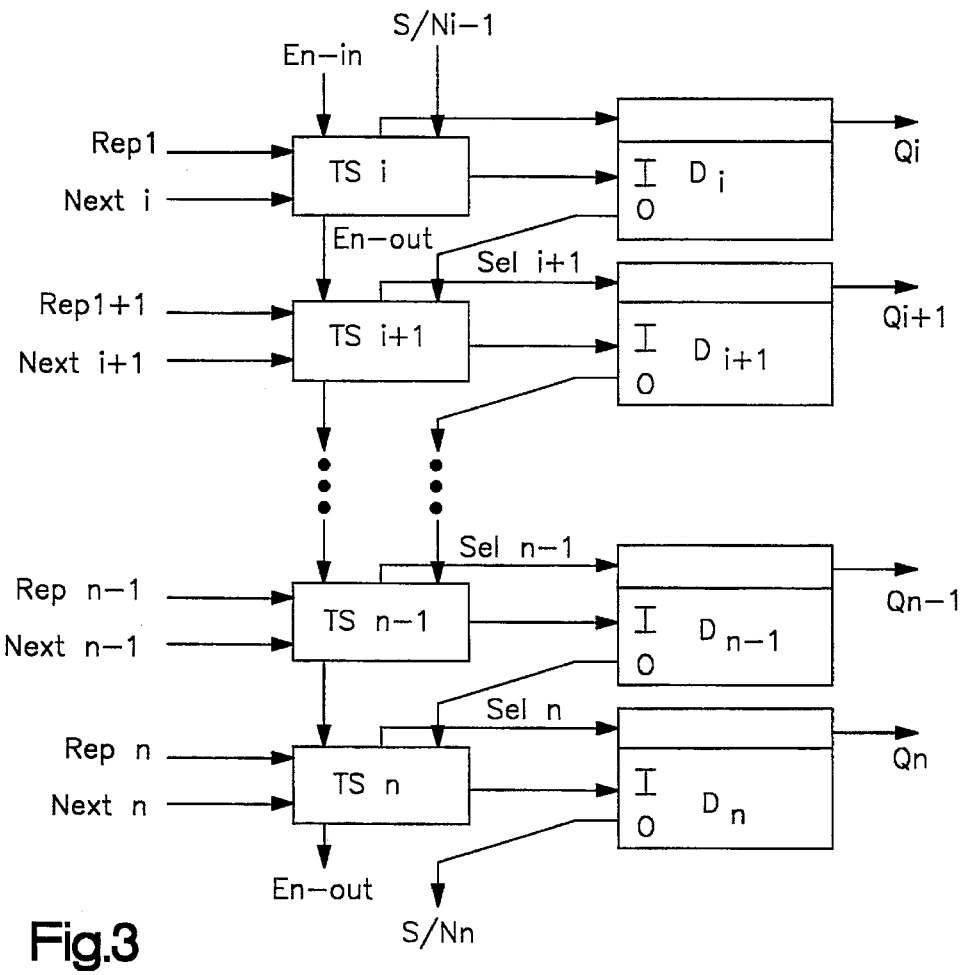
Figure 4:
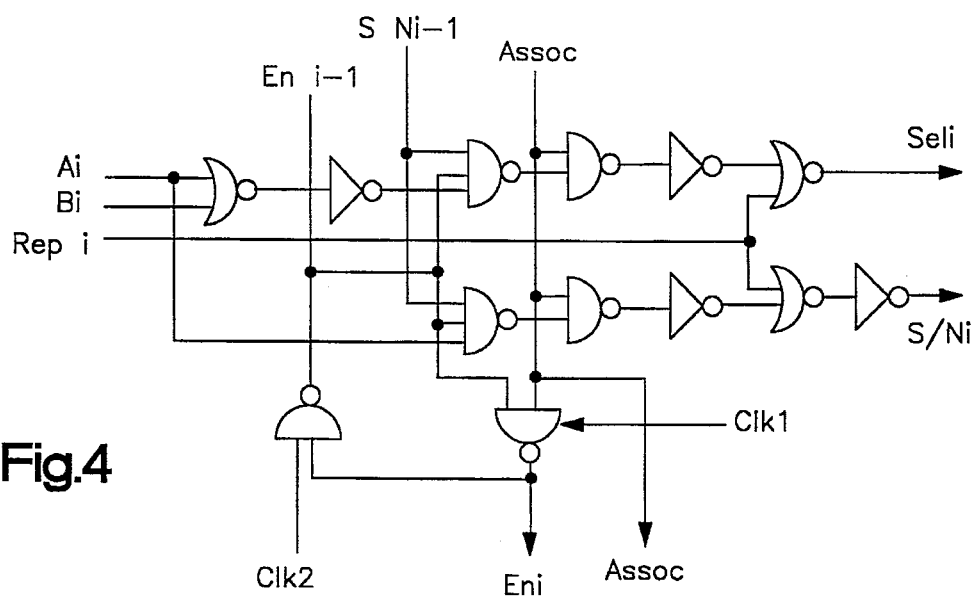

Each word of each association also includes a response field (or result field), designated by "Resp" in FIGS. 3 and 4. This field includes response information obtained during the comparison of the word with which it is associated to the stored data words.

The TAG module is organized into several parts, known as "TAG/slices". Each word of an association is processed by a TAG/slice. These TAG/slices are organized synchronously, even though the processing carried out by a TAG module may seem asynchronous when viewed from the outside.

In FIG. 3, the architecture of this processing module for variable-length TAG words, including a sequence of TAG/slices, is shown. Each TAG/slice takes into consideration the response field (Resp) and the Next field of the word that it processes; for example, in FIG. 3, the first TAG/slice shown, $TS_i$, processes the ith word of the association whose response field is $Resp_i$ and whose Next field is $Next_i$. This first TAG/slice $TS_i$ thus takes into consideration both the information $REP_i$ and the other information $Next_i$. Moreover, this TAG/slice receives response signals by means of the dialogue signal called Enable (En-in or En-out), this dialogue signal coming from the preceding TAG/slice, i.e. from the TAG/slice processing the i-1th word of the association. In effect, each dialogue signal ensures the synchronization of two sequential slices of the TAG operator.

This TAG/slice also receives the Some/None signal ($S/N_{i-1}$) coming from the TAG/slice processing the i-1th word. This Some/None signal indicates to the control unit the presence or absence of a response. This signal is used for the calculation of selection signals $SEL_i$. The selection signal (SEL) is transmitted down the master/slave flip-flop ($D_i$) to signal the result state of the comparison already executed in the association whose words have a position less than or equal to the word in position i.

In effect, $Resp_i$ indicates whether the ith word has been found in the memory; the Some/None signal, $S/N_{i-1}$, transmits the result found to the TAG/slice of the i–1th word. Thus if the ith word has been found in the memory, i.e. if $Resp_i$ is equal to 1 (i.e. it contains the information that the ith word exists in the memory) and if the Some/None signal, $S/N_{i-1}$, coming from the i–1th word indicates that the processed part of the association exists in the memory, then the signal $SEL_i$ transmits information down the flip-flop $D_i$, signifying that the part of tile association up to the ith word has been found in tile memory. Parallel to that, a signal is transmitted from the TAG/slice $TS_i$ to input i of flip-flop $D_i$. At the output of flip-flop $D_i$, one thus obtains a value $Q_i$ (0 or 1) indicating whether or not the beginning of the association has been found intact in the memory.

A high order output of flip-flop $D_i$ sends the Some/None signal, $S/N_i$, to the next TAG/slice, $TS_{i+1}$, i.e. the TAG/slice that processes the i+1th word of the association. The TAG/slice of the ith word also generates an Enable signal whose destination is the TAG/slice $TS_{i+1}$.

The same is true for all the TAG/slices of the module for processing variable-length words up to the TAG/slice of tile ith and last word of the association. One thus obtains the value $Q_n$ at the output of the last flip-flop ($D_n$).

Thus the indication in the Next field of the beginning of an association (for example, the indication that the word considered is the first in the association), allows one to take into account the response of the first word of an association involved in the comparison. In the course of the following selection, the TAG operator of the first word of an association (first TAG/slice) generates the Enable-out signal (Enable signal at the output, En-out) towards the following word in order that the responses of the words that are contiguous to the first word not be taken into account. It then resets its Enable-in signal to 0 (Enable signal as an input, En-in) so that the responses that may be obtained in tile course of the comparisons of the following words not be taken into account at this level.

The value of this signal depends on that of the Enable-in signal. The Enable signals allow one to prevent simultaneous responses of two occurrences of an element in one and the same association from being considered.

For all the elements in one association, except for the last word of the association, the signals ($SEL_i$) are set at 0 regardless of the values of the response signals ($Resp_i$) obtained. It is thus the value of the selection signal of the last word of each association ($SEL_n$) which reflects the result obtained for the whole association.

The propagation of response signals between two successive words in the same association is obtained by means of a Some/None signal (which, it should be recalled, indicates the presence or absence of a response) calculated in each TAG/slice, so that the calculation of the value of the last selection signal SEL of each association is correct.

In FIG. 4, the logic circuit diagram is presented for the TAG operator, and more precisely, for a slice of a TAG, i.e. a TAG/slice. This logic circuit includes NOT-AND logic gates, NOT-OR logic gates, and inverters.

As the input for a TAG/slice, one has the response field $Resp_i$, as explained in the preceding figure, and the position bits $A_i$ and $B_i$ as an input for the two inputs of the same NOT-OR logic gate. One can also see in this logic circuit diagram that the inputs of the enable signals $En_{i-1}$ come from TAG/slice $TS_{i-1}$ and the Some/None signals $S/N_{i-1}$ from that same TAG/slice ($TS_{i-1}$). One also can see two clocks sending clock signals (CLK1 and CLK2) to the NOT-AND logic gates and an ASSOC command, as an input, which is sent by the control unit. This ASSOC command indicates that associations greater than X bits (for example, 32) in size are to be processed. It is thus directed by the control unit.

Each content addressable operation allows for the coding of information related to the data register and the masking register, and to the content addressing and reading of the responses obtained. The parameters that that operation contains indicate the type of associative access to be carried out (simple access or multiple access), the value of the mask, the value of the selection key, and the type of multiple response management to be carried out (reading of the first response, reading of the next response, or reading of all the responses).

One can also see in the logic circuit diagram in FIG. 4 the different outputs of a TAG/slice, namely the Enable-out output and ASSOC output which sends information to the next TAG/slice, an output of selection signals SEL and an output of Some/None signals.

The value "1", on the last selection signal $SEL_n$ of each association, indicates to the multiple response management module connected to the output of the flip-flops that all the words in one and the same association fulfill the selection criteria. A "0" value signifies, on the contrary, that all the words of one and the same association do not fulfill the selection criteria.

Such processing of variable size associations allows for the preservation of homogeneity in the sequencing of operations, in order to avoid possible overlapping, and also allows for the use of a multiple response module of the usual type regardless of the types of content addressable operations. This multiple response management module ensures the reading of TAG output responses. The reading of responses can be carried out in several different ways:

the responses of one and the same association can be read on the basis of the last response, i.e. in the case in which the memory is organized in stacks;

the responses can be read on the basis of the first response.

However the reading of the responses of one and the same association is carried out, an adding/subtracting device is used. This adder/subtracter receives, as an input, the size of the association and the address of the last selection signal (SEL) that has satisfied the selection criterion.

According to the first way of reading the responses, i.e. when the reading is based on the last response, the address is decremented as the responses are read.

According to the second way of of reading the responses, i.e. when the responses are read based on the first response, a subtraction is carried out between the address supplied by the multiple response management module and the size of the association in order to begin reading starting with the first word.

In the case of complex associations, i.e. in the case of operations which, for example, involve a search for character strings in a text, the associative memory architecture of the present invention can be used. In this case, search operations are carried out by using the Next field of the search key, i.e., of the search argument, rather than the Next field of the words of each association in the memory. This allows one to locate the beginning of the string, or possibly several strings in a text in the memory, the role of the TAG operator remaining unchanged.

Returning to FIG. 1, one can see that the multiple response management module (15) is connected at its output to an input of an address register (17). In effect, the data regarding results obtained as an output of the TAG (13) are input into this multiple response management module (15) which generates an address for each of these data. The said data are then input into the address register (17), and are then transmitted from the address register to a decoder (19) which decodes them and supplies the memory map (1) the appropriate data to read.

When this architecture is realized in another way, the address register (17) can be connected in parallel with a data register not shown in the figure, the two registers— the address register and the data register— being themselves connected to an adder/subtracter. This adder/subtracter also receives as an input the type of operation to be carried out, i.e. addition or subtraction.

In FIG. 5, the stages of an inequality test are shown in which the search argument is the datum (01010) that is to be compared with the stored data (10010, 01011, 00101 and 11010).

For this inequality test, one seeks to locate all the words in the memory whose content is greater than 01010. This inequality operation is reduced to a series of equality operations. For each bit of the search argument, 01010, the following steps are carried out:

scanning of the search argument, starting with the high order bit, in search of a "0" bit;

setting of this bit at "1";

masking of all the bits that are of lower order than this bit set at "1";

carrying out of the equality test operation on all the words in the memory;

storing of the result in the response register.

One thus seeks the stored data which are greater than the search argument. In this figure, the search argument is shown in block A, the data stored in tile memory are shown in blocks B1, B2, B3 and B4, and the responses obtained after each comparison are shown in blocks C1, C2, C3 and C4.

Like all the operations carried out by the associative memory covered by the invention, the inequality test is reduced to a series of equality operations. Moreover, the search argument in A is successively compared, through an equality test, to tile data B1, B2, B3 and B4 which are stored in the memory. As the datum A is not equal to any of the data in the memory, the answers in C1, C2, C3 and C4 are null.

The search argument is then input into the scanning module and then into the masking unit where it is processed. At the output of the scanning module's decoder (or of the second shift register, in the case of the second way of realizing the invention), the value generated is 10000. The comparison datum obtained as the output of the scanning module, i.e. at the output of the exclusive OR (XOR) logic gate is thus 11010. The search argument is then reproduced with its first bit "0" set at "1". The search argument is thus modified: its high order bit is set at "1" and the values which follow are masked and thus are not taken into account in this equality operation. The high order bit of value "1" is compared, in an equality test, with the high order bits of the data B1, B2, B3 and B4. The responses thus obtained are "1" for C1 and C4 and "0" for C2 and C3.

In Table T3, datum A of Table T2 has been newly processed in the scanning module and in the masking unit, and it becomes 011 followed by two masked bits. It is thus the three highest order bits, 011, which are compared to the equivalent bits of the data stored in the memory, i.e., to bits 100 of datum B1, 010 of datum B2, 001 of datum B3 and 110 of datum B4. The responses thus obtained are 1 for C1 and C4, and 0 for C2 and C3.

Lastly, in Table T4, datum A of Table T3 has once again been processed in the scanning module and the masking unit, and it becomes 01011. Thus the whole of datum A is compared to the data B1, B2, B3 and B4 through an equality test, the responses of which are 1 for C1, C2 and C4, and 0 for C3.

This illustration shows how it is possible to reduce an inequality test to a series of equality tests.

FIG. 6 illustrates the steps of a search operation for values which lie between two limits, X and Y, whose respective values are 01110 and 11000. This figure will be described more succinctly than the preceding figure, as its principle of comparison is virtually identical to that of the preceding operation, in that the inequality operations (greater than and less than) are reduced to a series of equality operations.

In this search operation, values are sought which lie in an interval [X, Y]. In order to find them, one tests the inequality, X less than the values sought, and the inequality, Y greater than the values sought; one then carries out the intersection of the results obtained in each of the two preceding tests.

The value X is thus the first search argument and the value Y the second. The values W1, W2, W3 and W4 are the values of the data stored in the memory; K1, K2, K3 and K4 are the responses obtained for the first inequality test (X<?); and Z1, Z2, Z3 and Z4 are the responses obtained for the second inequality test (Y >?).

Tables T1, T2 and T3 show the three successive equality operations carried out to find the values greater than X. Tables T4, T5 and T6 show the results obtained for the three equality operations carried out to find the values less than Y. In Table T3, one has thus found (after determination of the intermediary values in Tables T1 and T2), the response to the first test, namely K1 and K4 equal to 1 and K2 and K3 equal to 0. In Table T6, responses K1, K2, K3 and K4 have been stored and the responses Z1 and Z4 have been determined to be equal to 1 and the values Z2 and Z3 to be equal to 0, after determination of intermediary values in Tables T4 and T5. The values contained in the memory and which lie within the interval [X, Y] are thus the data W1 and W4 whose values are 10011 and 10010, respectively. It should thus be clear that, in addition to equality and inequality operations, this architecture also allows for the conduct of searches b two limits, searches for the maximum, convergence, calculation of absolute limits, and proximity searches, by reducing all of these operations to a series of equality operations.

Requiring no modification, this associative memory architecture also allows for the execution of parallel adding operations and operations derived therefrom (such as multiplication), with the possibility of multiple writing on all the words contained in the memory.

Furthermore, the skeletal coding carried out thanks to the ASSOC operation allows for the intrinsic processing of operations to be executed in parallel or pipelined. The associative memory is thus independent of the host system and capable of carrying out a series of processing operations without regularly calling upon the system processor.

We claim:

1. An associative memory allowing for the comparison of search data with a multiplicity of data stored in at least one data register and available at the outpupts of said data register, comprising:

Comparison means (1, 3, 5, and 7) with inputs connected to the outputs of the data register for processsing the search data and comparing the search data with the stored data, these comparison means supplying result data at no less than one output, said comparison means including a masking unit, a preprocessing unit, and a memory map, said preprocessing unit generating, on the basis of the search data, comparison data to execute a plurality of comparison functions in the memory map, said masking unit being connected to an output of the preprocessing unit and to an input of the memory map and being operable to mask at least one part of a word of a comparison datum so that the unmasked part of the word is compared, in the memory map, with the corresponding parts of the words of the stored data;

Manipulation means with at least one input connected to the output of the comparison means for processing the result data obtained after comparison of the search data with the stored data;

A control unit (21) to control information exchanges between the comparison means and the manipulation means, wherein the manipulation means include a processing unit for variable-length word associations (13), each search datum and stored datum, including a word or an association of variable length words.

2. An associative memory in accordance with claim 1, wherein the preprocessing unit includes, first, a shift register (31) connected to an output of the data register and to an input of the control unit, a bit counter (32) connected to an output of the control unit and a decoder (33) connected to an output of the bit counter; and second, an address register (35) connected to the output of the data register, and an exclusive OR (XOR) logic gate (36) connected to an output of the address register and to an output of the decoder in order to supply the comparison datum.

3. An associative memory in accordance with claim 1, wherein the preprocessing unit includes, first, a shift register (31) connected to an output of the data register and to an input of the control unit, and a second shift register (34) connected to an output of the control unit; and an address register (35) connected to the output of the data register, and an exclusive OR (XOR) logic gate (36) connected to an output of the address register and to an output of the second shift register to supply the comparison datum.

4. An associative memory in accordance with claim 1, wherein the association processing unit includes a module for processing words (13) to manage a dialogue between the words of one and the same association, each word of an association having a position field indicating the position of the word in the association, and a result field indicating the result of the comparison of the word of the search datum with the words of the stored data; the management of the dialogue is carried out as a function of the indications contained in the position and result fields.

5. An associative memory in accordance with claim 1, wherein the processing unit also includes a multiple response management module (15) to generate an address for each of the result data.

* * * * *

UNITED STATES PATENT AND TRADEMARK OFFICE
CERTIFICATE OF CORRECTION

PATENT NO. : 5,502,832            Page 1 of 2
DATED : March 26, 1996
INVENTOR(S) : Ali-Yahia et al.

It is certified that error appears in the above-indentified patent and that said Letters Patent is hereby corrected as shown below:

On the Title page, in the Abstract, line 1, delete "association" and insert --associative--.

Column 1, line 48, delete "Stage" and insert --State--.

Column 5, line 66, delete "12" and insert --I2--.

Column 6, line 16, delete "12" and insert --I2--.

Column 7, line 40, after "media" insert --or means--; and
          line 44, after "media" insert --or means--.

Column 8, line 39, delete "tile" and insert --the--;
          line 40, delete "tile" and insert --the--;
          line 51, delete "tile" and insert --the--; and
          line 65, delete "tile" and insert --the--.

Column 10, line 60, delete "tile" and insert --the--.

Column 11, line 1, delete "tile" and insert --the--.

UNITED STATES PATENT AND TRADEMARK OFFICE
CERTIFICATE OF CORRECTION

PATENT NO. : 5,502,832
DATED : March 26, 1996
INVENTOR(S) : Ali-Yahia et al.

It is certified that error appears in the above-indentified patent and that said Letters Patent is hereby corrected as shown below:

Column 12, line 1, delete "b" and insert --between--; and
line 19 (Claim 1, line 3), delete "outpupts" and
insert --outputs--.

Signed and Sealed this

Third Day of September, 1996

Attest:

BRUCE LEHMAN

Attesting Officer    Commissioner of Patents and Trademarks